(12) United States Patent
Alanazi

(10) Patent No.: US 9,704,402 B2
(45) Date of Patent: Jul. 11, 2017

(54) VEHICLE INDICATORS

(71) Applicant: Mohammed Abdullah Alanazi, Los Angeles, CA (US)

(72) Inventor: Mohammed Abdullah Alanazi, Los Angeles, CA (US)

( * ) Notice: Subject to any disclaimer, the term of this patent is extended or adjusted under 35 U.S.C. 154(b) by 0 days.

(21) Appl. No.: 14/956,932

(22) Filed: Dec. 2, 2015

(65) Prior Publication Data

US 2017/0162046 A1 Jun. 8, 2017

(51) Int. Cl.
*G08G 1/16* (2006.01)
*B60Q 5/00* (2006.01)
*B60Q 1/34* (2006.01)
*B60Q 1/44* (2006.01)

(52) U.S. Cl.
CPC .................. *G08G 1/16* (2013.01); *B60Q 1/34* (2013.01); *B60Q 1/444* (2013.01); *B60Q 5/005* (2013.01)

(58) Field of Classification Search
CPC .......... B60Q 1/34; B60Q 1/444; B60Q 5/005; G08G 1/16
USPC .......................................................... 340/435
See application file for complete search history.

(56) References Cited

U.S. PATENT DOCUMENTS

| 4,667,177 A | 5/1987 | Athalye |
| 5,089,805 A | 2/1992 | Salsman |
| 2006/0125616 A1* | 6/2006 | Song ................. B60Q 1/38 340/463 |
| 2007/0159311 A1* | 7/2007 | Schober .............. B60Q 1/525 340/435 |
| 2010/0085180 A1 | 4/2010 | Mathis |
| 2015/0008823 A1* | 1/2015 | Lim .................... B60Q 1/30 315/77 |

FOREIGN PATENT DOCUMENTS

GB 2 328 092 A 2/1999

OTHER PUBLICATIONS

Caleb Trotter, et al., "Brake Intensity Advisory System", ECE 4007 Senior Design Project, http://www.ece.gatech.edu/academic/courses/ece4007/11fall/ECE4007L01/Im2/Design%20Proposal/Design%20Proposal.pdf, 2011, 19 pages.
Jeremy Zawodny, "Variable Intensity Brake Lights", http://jeremy.zawodny.com/blog/archives/002370.html, Aug. 10, 2004, 7 pages.

* cited by examiner

*Primary Examiner* — Leon Flores
(74) *Attorney, Agent, or Firm* — Oblon, McClelland, Maier & Neustadt, L.L.P.

(57) ABSTRACT

A vehicle indicator system includes a sensor provided on a base vehicle to measure a distance of an adjacent vehicle from the base vehicle, and an indicator provided on the base vehicle at a position to emit an indicator signal displayed towards the adjacent vehicle, which indicator signal can be ascertained by an operator of the adjacent vehicle. An intensity of the indicator signal is inversely proportional to a distance of the adjacent vehicle from the base vehicle. The vehicle indicator system also includes circuitry provided at the base vehicle and configured to receive an input signal from the sensor and to provide an output signal to the indicator for generating the indicator signal.

20 Claims, 10 Drawing Sheets

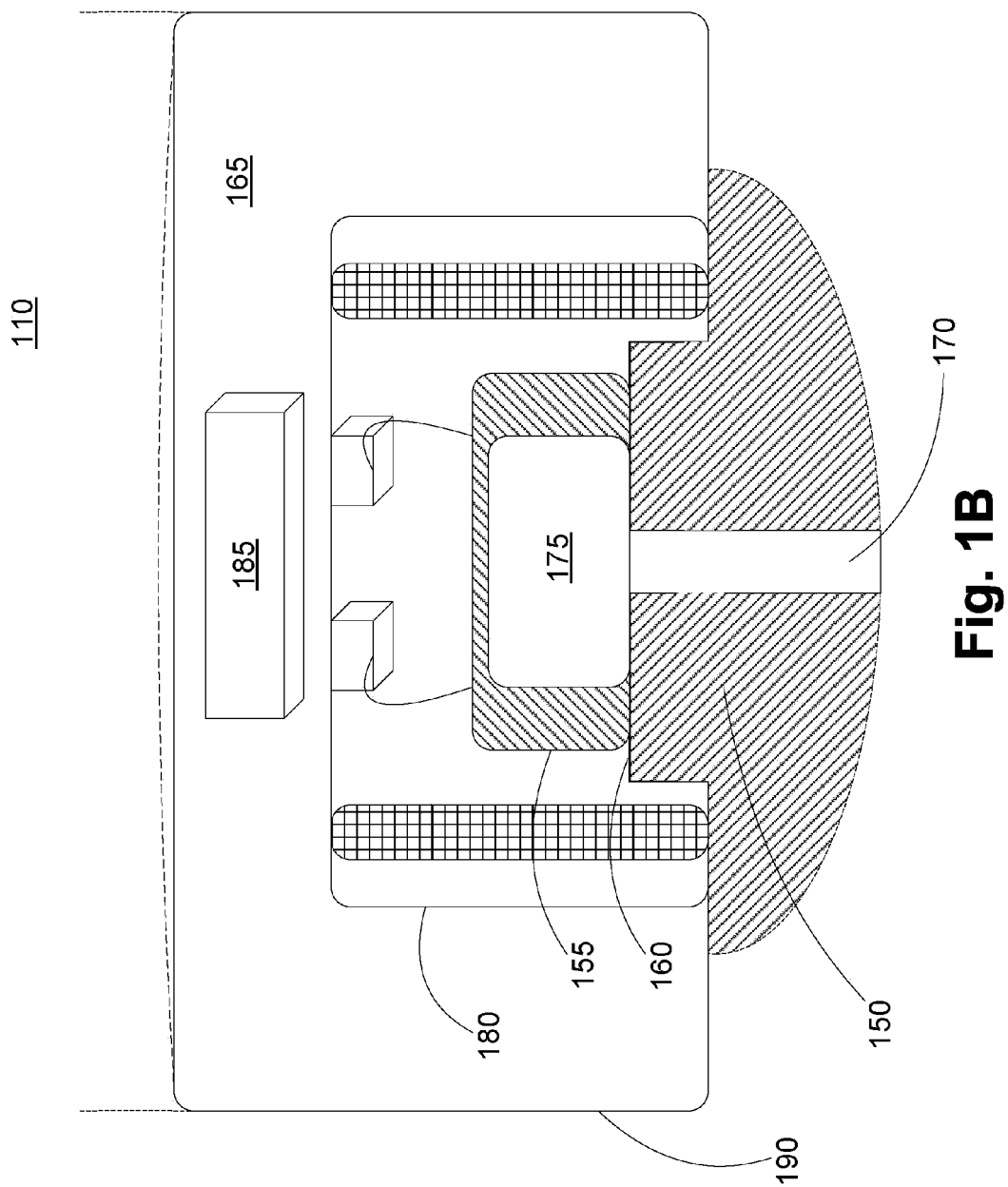

VEHICLE INDICATORS

BACKGROUND

Grant of Non-Exclusive Right

This application was prepared with financial support from the Saudi Arabian Cultural Mission, and in consideration therefore the present inventor(s) has granted The Kingdom of Saudi Arabia a non-exclusive right to practice the present invention.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the described embodiments herein.

Vehicle indicators are available to alert a driver of a base vehicle of certain actions of a nearby vehicle. For example, a flashing light indicator alerts a driver that another vehicle has come within a certain distance of the front or rear of the base vehicle. Another example is a parking indicator to alert a driver of the base vehicle of the closeness of a curb or another parked vehicle. In addition, a vehicle may have corrective software to automatically adjust an aspect of the base vehicle in response to its surroundings. However, these indicators do not alert drivers of other vehicles that are close to the base vehicle.

SUMMARY

In one embodiment, a vehicle indicator system includes a sensor provided on a base vehicle to measure a distance of an adjacent vehicle from the base vehicle, and an indicator provided on the base vehicle at a position to emit an indicator signal displayed towards the adjacent vehicle, which indicator signal can be ascertained by an operator of the adjacent vehicle. An intensity of the indicator signal is inversely proportional to a distance of the adjacent vehicle from the base vehicle. The vehicle indicator system also includes circuitry provided at the base vehicle and configured to receive an input signal from the sensor and to provide an output signal to the indicator for generating the indicator signal.

In one embodiment, a vehicle indicator system includes a braking sensor provided on a base vehicle to measure an intensity of an applied braking force of the base vehicle, and a braking indicator provided on the base vehicle at a first position to emit a braking indicator signal displayed towards an adjacent vehicle, which braking indicator signal can be ascertained by an operator of the adjacent vehicle. An intensity of the braking indicator signal is proportional to the applied braking force of the base vehicle. The vehicle indicator system also includes a steering column sensor provided on the base vehicle to measure a degree of turning of a steering wheel of the base vehicle, and a steering wheel turning indicator provided on the base vehicle at a second position to emit a steering wheel turning indicator signal displayed towards the adjacent vehicle, which steering wheel turning indicator signal can be ascertained by the operator of the adjacent vehicle. The vehicle indicator system also includes circuitry provided at the base vehicle and configured to receive an input signal from the braking sensor and the steering column sensor, and circuitry provided at the base vehicle and configured to provide an output signal to the braking indicator and the steering wheel turning indicator, respectively for generating the associated braking indicator signal and steering wheel turning indicator signal.

In one embodiment, a vehicle indicator system includes a proximity sensor provided on a base vehicle to measure a distance of an adjacent vehicle from the base vehicle, and a proximity indicator provided on the base vehicle at a first position to emit a proximity indictor signal displayed towards the adjacent vehicle, which proximity indicator signal can be ascertained by an operator of the adjacent vehicle. An intensity of the proximity indicator signal is inversely proportional to a distance of the adjacent vehicle from the base vehicle. The vehicle indicator system also includes a steering column sensor provided on the base vehicle to measure a degree of turning of a steering wheel of the base vehicle, and a steering wheel turning indicator provided on the base vehicle at a second position to emit a steering wheel turning indicator signal displayed towards the adjacent vehicle, which steering wheel turning indicator signal can be ascertained by the operator of the adjacent vehicle. The vehicle indicator system also includes circuitry provided at the base vehicle and configured to receive an input signal from the proximity sensor and the steering column sensor, and circuitry provided at the base vehicle and configured to provide an output signal to the proximity indicator and the steering wheel turning indicator, respectively for generating the associated proximity indicator signal and steering wheel turning indicator signal.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1B illustrates a braking sensor according to an embodiment;

DETAILED DESCRIPTION OF THE EMBODIMENTS

Embodiments herein describe vehicle indicators and vehicle indication systems, such as braking, steering, and distance gauging. One or more indicators alert nearby drivers of certain actions of a base vehicle.

Figure 1A:
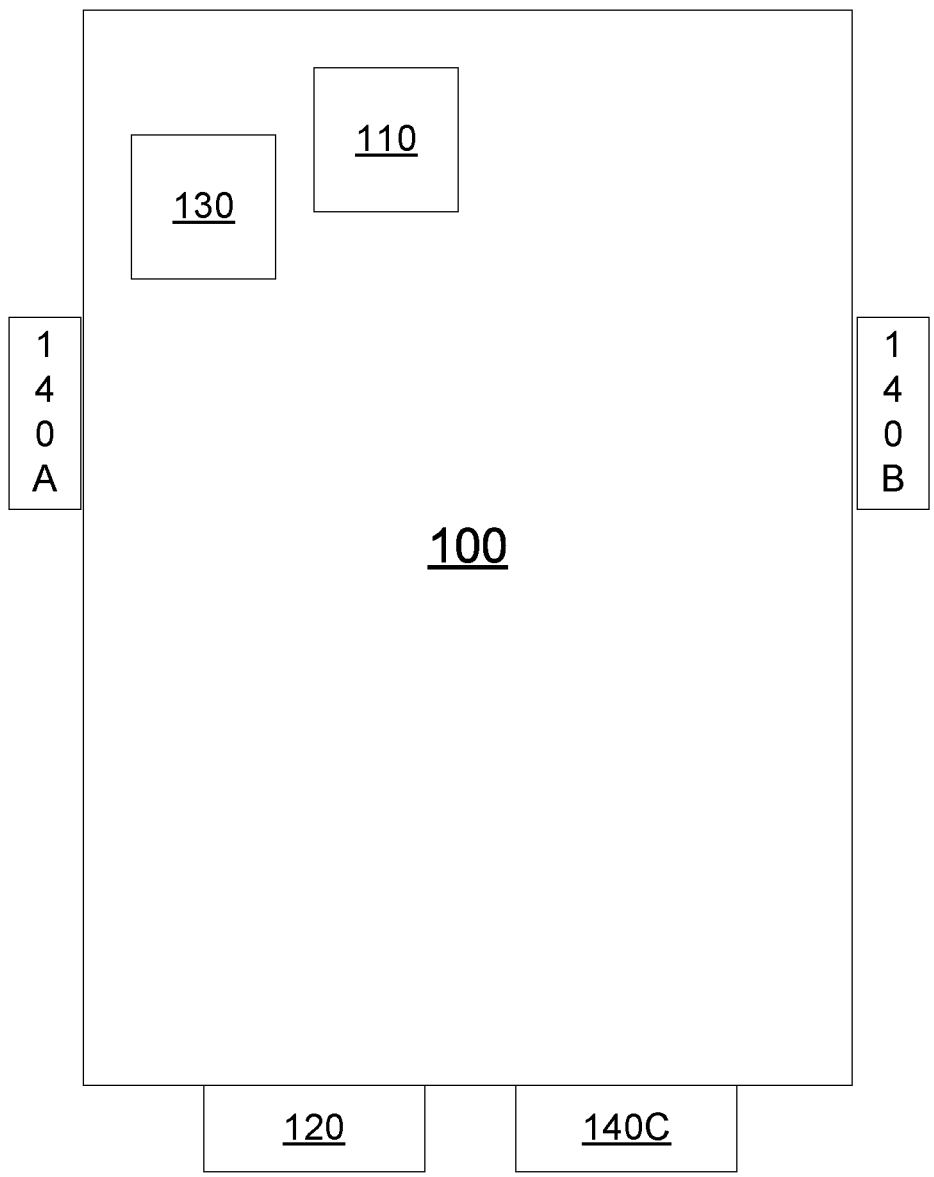
FIG. 1A is a block diagram illustrating a vehicle indicator system according to an embodiment.

FIG. 1A illustrates an embodiment of a vehicle indicator system 100 for a base vehicle. Vehicle indicator system 100 provides an indication to one or more adjacent vehicles of a change or application of braking force and of a steering adjustment made by the base vehicle. A braking sensor 110 measures an intensity of a braking force applied by a driver of the base vehicle. Braking sensor 110 can also be referred to as a pressure sensor. An example of such a braking sensor can be that described in U.S. Pat. No. 6,298,730, which is illustrated in FIG. 1B. Braking sensor 110 includes a fitting 150 bolted and fixed to a pressure-detecting module 155 by a weld 160. An output device 165 is electrically connected to the pressure-detecting module 155. Fluid pressure is introduced into a pressure port 170 of the fitting 150, which is converted into a strain by a diaphragm 175. This forms the pressure-detecting module 155. The strain is detected by a strain gauge (not shown) of the diaphragm 175. An electric signal determined by a resistance value of the strain gauge is outputted by the output device 165. Output device 165 has a base member 180 disposed around the pressure-detecting module 155. A circuit substrate (not shown) is disposed above the base member 180, and electronic circuit components 185 such as an IC, a resistor, and a capacitor are installed on the circuit substrate for processing a signal from the pressure-detecting module 155. An output connector (not shown) outputs a signal from the electronic circuit components 185.

The pressure-detecting module 155 and the circuit substrate of the output device 165 are covered by a metal case 190 for electromagnetic shielding. A resin-made covering member (not shown) is provided outside the metal case 190 to block dust and other particles to form an exterior of the braking sensor 110.

The braking sensor 110 of FIG. 1B is given for illustrative purposes only. Any sensor capable of measuring a braking force can be used for braking sensor 110.

Figure 1C:
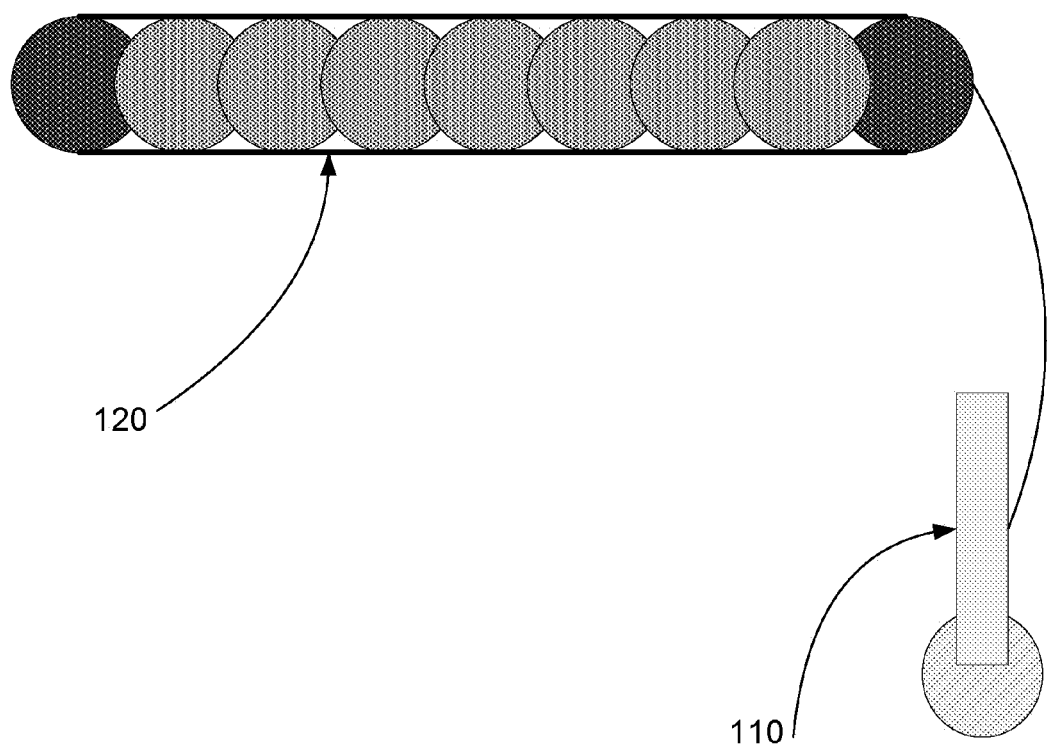
FIG. 1C illustrates a braking sensor and a braking indicator according to an embodiment.

FIG. 1C illustrates an embodiment of the braking sensor 110 and a braking indicator 120. Vehicle indicator system 100 includes circuitry that is configured to receive an input signal from the braking sensor 110 to provide an output signal to the braking indicator 120. The number of illuminated lights is directly proportional to the applied braking force. As an example given for illustrative purposes only, the two outside lights can illuminate when the brake pedal is initially applied at a first applied force. When a second force is applied, the next two inner sets of opposing lights can be illuminated in addition to the two outside lights. A similar process continues for the remaining lights. When a braking force has been applied to completely stop the vehicle, all lights can be illuminated. In an alternative embodiment, all lights could be illuminated, wherein the intensity of illumination increases with increased applied braking force.

With reference back to FIG. 1A, the braking indicator 120 can be located in one or more exterior positions on the base vehicle, including the rear side of the base vehicle. A braking indicator 120 can also be located on either side of the base vehicle. Braking indicator 120 is configured to indicate an amount of braking force applied to the brake pedal, and the intensity of braking indicator 120 is directly proportional to the amount of braking force applied. The number of lights and/or the intensity of the lights can increase in direct proportion to an increase of braking force applied. In addition or alternatively, the lights can flash at an increased rate in direct proportion to an increase of braking force applied.

Vehicle indicator system 100 can also include a steering column sensor 130, which is configured to measure a turning angle of a steering wheel of the base vehicle. One embodiment of the steering column sensor 130 includes a coil spring mechanism wrapped about the steering column, which respectively loosens or tightens with an angle of turning in each direction. The amount of tautness in the spring mechanism is determined, e.g., by a piezoelectric or pressure gauge, and is output as a signal to one or more steering wheel turning indicators, such as a left-side steering wheel turning indicator 140A, a right-side steering wheel turning indicator 140B, and/or a back-side steering wheel turning indicator 140C. Other embodiments could include a rotary digital encoder. Vehicle indicator system 100 includes circuitry configured to receive an input signal from the steering column sensor 130 and provide an output signal to the steering wheel turning indicators 140A, 140B, and 140C.

The steering wheel turning indicators 140A, 140B, and 140C include any combination of visual and/or audio effects that will alert a driver of an adjacent vehicle of a change in direction by the base vehicle. In addition, the intensity of the visual and/or audio indicators can vary in direct proportion to the amount of turning of the steering wheel of the base vehicle. The steering wheel turning indicators 140A, 140B, and 140C can also indicate the direction of turning. One embodiment includes one or more illuminated arrows which point in the left or right direction of steering wheel turning as viewed from the driver's perspective. The number of arrows and/or the intensity of brightness of the arrows could vary in direct proportion to the turning degree of the steering wheel on the base vehicle.

The steering wheel turning indicators 140A, 140B, and 140C could include one or more arrow lights pointing in the right-hand direction for a clockwise turn of the steering wheel, and one or more arrow lights pointing in the left-hand direction for a counter-clockwise turn of the steering wheel. In one embodiment, the steering wheel turning indicator 140C is a single unit positioned on the rear end of the base vehicle. In the same embodiment or another embodiment, a steering wheel turning indicator 140B for the right-pointing arrows could be located on the right or passenger side mirror of the base vehicle, or it could be located on the right-rear side of the base vehicle. A second steering wheel turning indicator 140A for the left-pointing arrows could be located on the left or driver side mirror of the base vehicle, or it could be located on the left-rear side of the base vehicle. In an alternative embodiment, the words "left" and "right" could be displayed in addition to or in lieu of the left-pointing and right-pointing arrows, respectively.

The left and right pointing arrows could vary in shape, size, and number. In one embodiment, the size and number of pointing arrows could increase with an increase in turning angle or degree of the steering wheel. For multiple pointing arrows, the arrows could illuminate together or the arrows could light up in succession. In another embodiment, the one or more arrows could flash or blink with an increased rate as the turning angle or degree of the steering wheel increases. The illumination of the lights could also increase with an increased turning angle or degree of the steering wheel.

An audio signal could also be given to indicate a change in direction of the base vehicle, instead of a visual indicator or in addition to a visual indicator. The steering wheel turning indicators 140A, 140B, and 140C could produce a repeated audio signal via a left-positioned audio indicator for a left change in direction, and produce a repeated audio signal via a right-positioned audio indicator for a right change in direction. The audio signal could also include a repeated statement of "left" for a left change in direction and a repeated statement of "right" for a right change in direction.

Figure 2A:
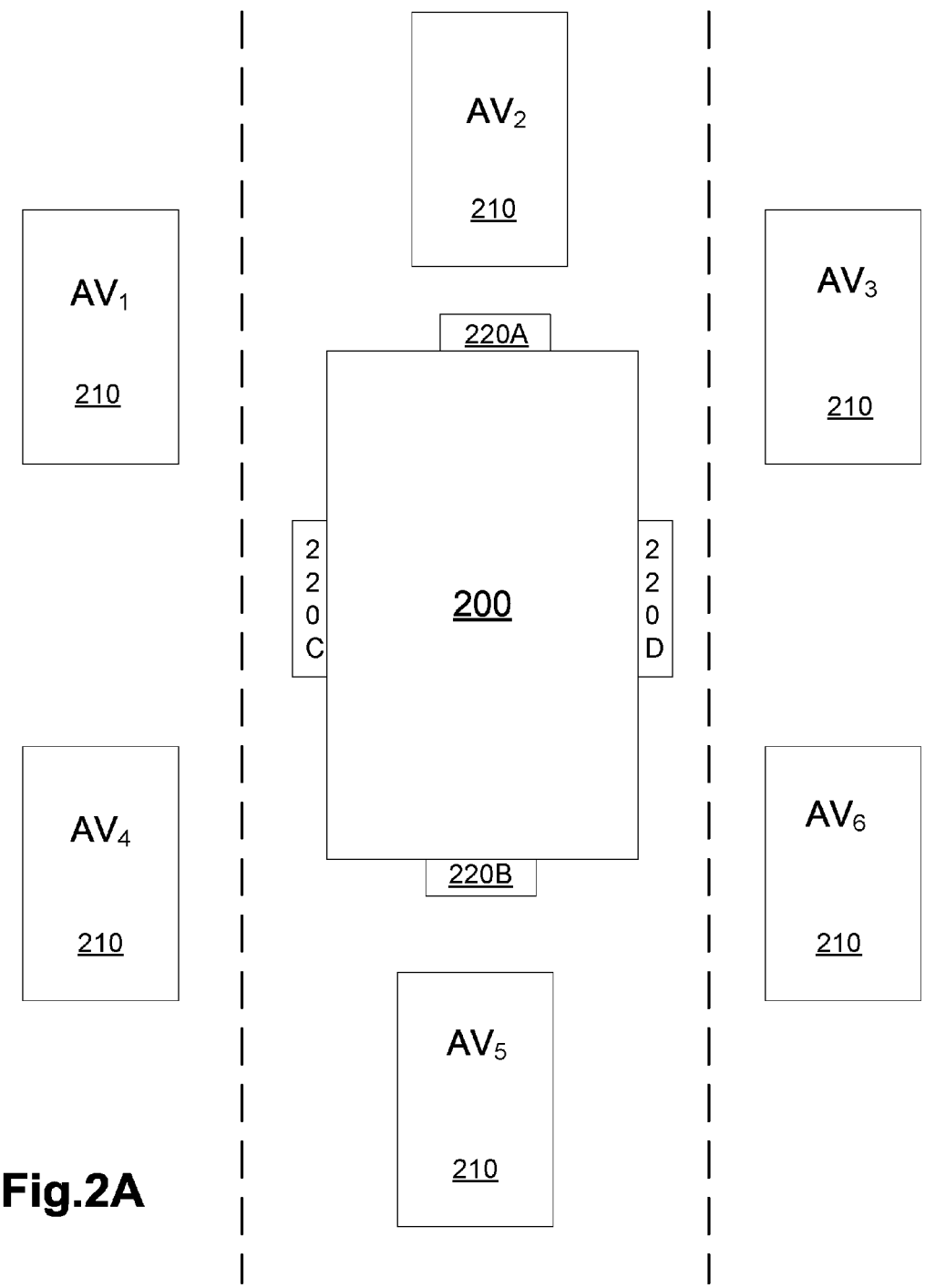
FIG. 2A is a block diagram illustrating a base vehicle surrounded by multiple adjacent vehicles according to an embodiment.

FIG. 2A illustrates a base vehicle 200 surrounded by multiple adjacent vehicles 210. In a typical driving environment, an adjacent vehicle 210 may be directly in front of the base vehicle 200, directly in back of the base vehicle 200, or on either side of the base vehicle 200. In congested traffic conditions, it is desirable to alert adjacent vehicles 210 of their close proximity to base vehicle 200. The close proximity can be due to one or more driving changes of the base vehicle 200 with respect to an adjacent vehicle 210 in braking, accelerating, or change in direction. The change in braking, accelerating, or direction could be due to changes by the base vehicle 200, an adjacent vehicle 210, or both.

FIG. 2A illustrates multiple indicator systems 220 on the base vehicle 200, each of which include one or more sensors and one or more indicators. An indicator system 220A located at the front of base vehicle 200 has circuitry configured to sense and indicate activity of an adjacent vehicle 210 directly in front of base vehicle 200. An indicator system 220B located at the rear end of base vehicle 200 has circuitry configured to sense and indicate activity of an adjacent vehicle 210 directly behind base vehicle 200. An indicator system 220C located on the left side and an indicator system 220D located on the right side (from a driver's perspective) of base vehicle 200 has circuitry configured to sense and indicate activity of an adjacent vehicle 210 located along a side of base vehicle 200.

Figure 2B:
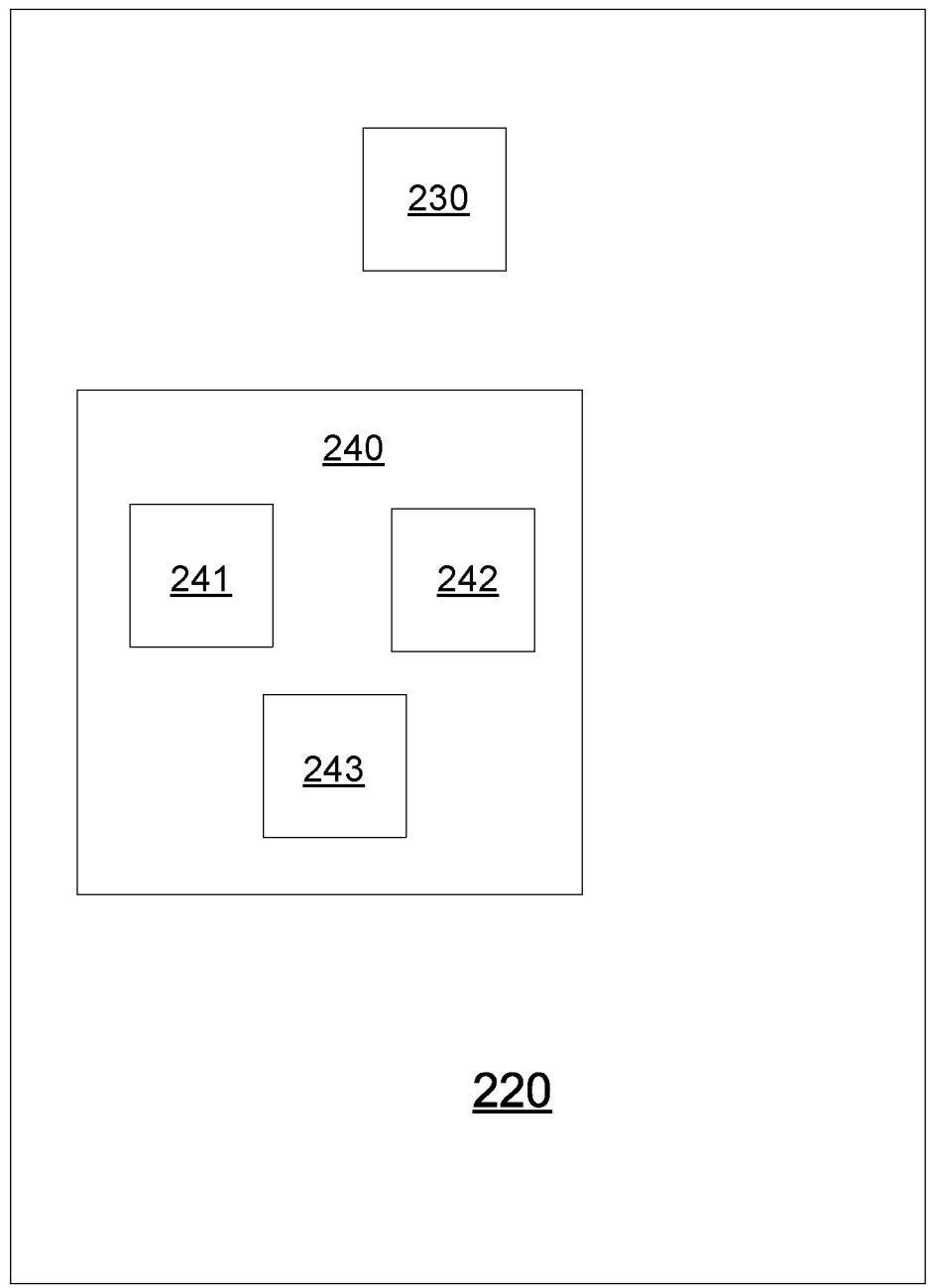
FIG. 2B is a block diagram illustrating two components of an indicator system according to an embodiment.

FIG. 2B illustrates two components of indicator system 220. A sensor 230 is configured to measure a distance from the base vehicle 200 to an adjacent vehicle 210, as illustrated in FIG. 2A. An indicator 240 provides a relative indication to an adjacent vehicle 210 of a change in proximity to base vehicle 200. The intensity level generated by indicator 240 is inversely proportional to the proximity of an adjacent vehicle 210 to base vehicle 200. In other words, the intensity level of indicator 240 will increase as the proximity between an adjacent vehicle 210 and base vehicle 200 decreases. In one embodiment, a threshold proximity distance is met before indicator 240 is activated. In another embodiment, the velocity of either base vehicle 200 or an adjacent vehicle 210 is also considered in conjunction with the proximity distance to determine a threshold for activation of indicator 240. As an example, the threshold proximity distance can be larger at higher velocities.

Sensor 230 can include any system configured to measure a distance between one or more moving objects relative to each other. Examples of sensor 230 include, but are not limited to an ultrasonic sensor, a real time location system (RTLS) sensor, a range finder sensor, and a camera tracking sensor.

An ultrasonic analog sensor measures a distance from the sensor to a target. A sound pulse is output from the base vehicle and is received back from the adjacent vehicle as a reflected echo. An analog output varies proportionally with the separation distance between the sensor and the target.

A RTLS sensor can track and identify the location of an object in real time using nodes or tags that are attached to or embedded in the object. A reader receives and processes wireless signals from the node or tag to determine its location and therefore, its proximity distance. The circuitry and associated programming instructions can be developed to use an item or feature as a node or tag that is commonly found on or within a vehicle. Signals from the tag or node include, but are not limited to a Bluetooth signal, a guidance positioning system (GPS) signal, and a cellular signal.

A laser or radar range finder measures the distance between two objects by sending out a light or radar signal and measuring a signal reflected from the distant object. A camera tracking sensor can track a size and height of an adjacent vehicle and there from, determine a proximity distance of the adjacent vehicle.

Other sensors configured to measure a distance between one or more moving targets are contemplated by embodiments described herein. Adjustments in configurations could be made to any of the sensors described above with respect to their positional locations on base vehicle 200. For example, indicators 220A and 220B of FIG. 2A could be adjusted based on the forward speed of the base vehicle 200. Distance thresholds would be larger if the base vehicle 200 is travelling at higher speeds on a highway. Likewise, distance thresholds would be smaller if the base vehicle 200 is travelling at slower speeds on an urban street. Indicator system 220 can be located on a front, rear, or either side of base vehicle 200 and is configured for the purpose of alerting an adjacent vehicle 210 of a decrease in proximity distance relative to base vehicle 200. An indicator response can be in the form of a visual and/or audio response. Examples of indicator 240 include, but are not limited to one or more lights, a displayed message, and an alarm, horn, or musical riff.

A light indicator 241 can include one light or a series of lights that increase in intensity as a proximity distance from base vehicle 200 to an adjacent vehicle 210 decreases. An alternative embodiment includes an increase in the number of illuminated lights as a proximity distance from base vehicle 200 to an adjacent vehicle 210 decreases. Light indicator 241 could be configured as part of a standard brake light or in addition to a standard brake light. Another embodiment of light indicator 241 includes flashing or blinking lights, wherein the one or more lights could flash or blink at an increased rate as a proximity distance from base vehicle 200 to an adjacent vehicle 210 decreases. Light indicator 241 could also use a combination of increased illumination and increased flashing, especially at a very close proximity. In addition, light indicator 241 can be programmed to adjust for different weather conditions, such as rain, snow, and fog, so that a maximum lighting effectiveness is obtained. For example, an increased light intensity could be used during a snow fall, and fog light illumination could be used during foggy conditions.

An audio indicator 242 can include an alarm or horn audio signal. The decibel level of the alarm or horn can increase as a proximity distance from base vehicle 200 to an adjacent vehicle 210 decreases. In addition or alternatively, the alarm or horn could be an intermittent signal, whose frequency of audio signals could increase as a proximity distance from base vehicle 200 to an adjacent vehicle 210 decreases. Circuitry in conjunction with programming instructions can provide a vast variety of audio signals. In addition, a musical riff could be used in lieu of an alarm or horn for audio indicator 242.

Another embodiment includes a message indicator 243. Message indicator 243 can include a short message or phrase of a few words, wherein the message parameters would increase as a proximity distance from base vehicle 200 to an adjacent vehicle 210 decreases. Example message parameters include increasing the font size of the text, increasing the illumination of the lighted text, or increasing a flashing rate of the text as a proximity distance from base vehicle 200 to an adjacent vehicle 210 decreases. Multiple messages of a similar theme could also be displayed. In addition, multiple languages could be programmed as part of the displayed message, either as a single combined message of multiple languages or as a series of multiple language messages.

Message indicator 243 could be adjusted based upon its position located upon base vehicle 200. For example, a message indicator 243 on the rear of base vehicle 200 would be immediately visible to an adjacent vehicle 210 following base vehicle 200. As a result, the message could contain more words and have a smaller font size. A message indicator 243 on the front of base vehicle 200 could be displayed in reverse, such that it would appear as normal text in a rearview mirror of an adjacent vehicle 210 in front of base vehicle 200. A message indicator 243 on a side of base vehicle 200 can be shorter in length and larger in font size to account for a shorter glance typically made by a driver in a sideward direction.

Combinations of various light, audio, and message indicators 240 are contemplated by embodiments described herein. In one embodiment, the rate of decreased proximity distance from base vehicle 200 to an adjacent vehicle 210 can be considered. For example, a high rate of decreased proximity distance could include a combination of indicators 240 to immediately alert a driver of an adjacent vehicle 210. Conversely, a slow rate of decreased proximity distance from base vehicle 200 to an adjacent vehicle 210 could be activated only after reaching a threshold proximity distance. Embodiments also include adjustments to indicators 240 located on the front, rear, or sides of base vehicle 200 to account for differences in relative speed. For example, an adjacent vehicle 210 located to a side of base vehicle 200 will have a low relative speed, as compared to an oncoming vehicle. Adjustments can also be made to indicators 240 to comply with local vehicle regulations.

Combinations of features from multiple vehicle indicator systems described above are contemplated by embodiments described herein. Two embodiments are given below for exemplary purposes only. Other combined vehicle indicator systems are considered herein.

Figure 3:
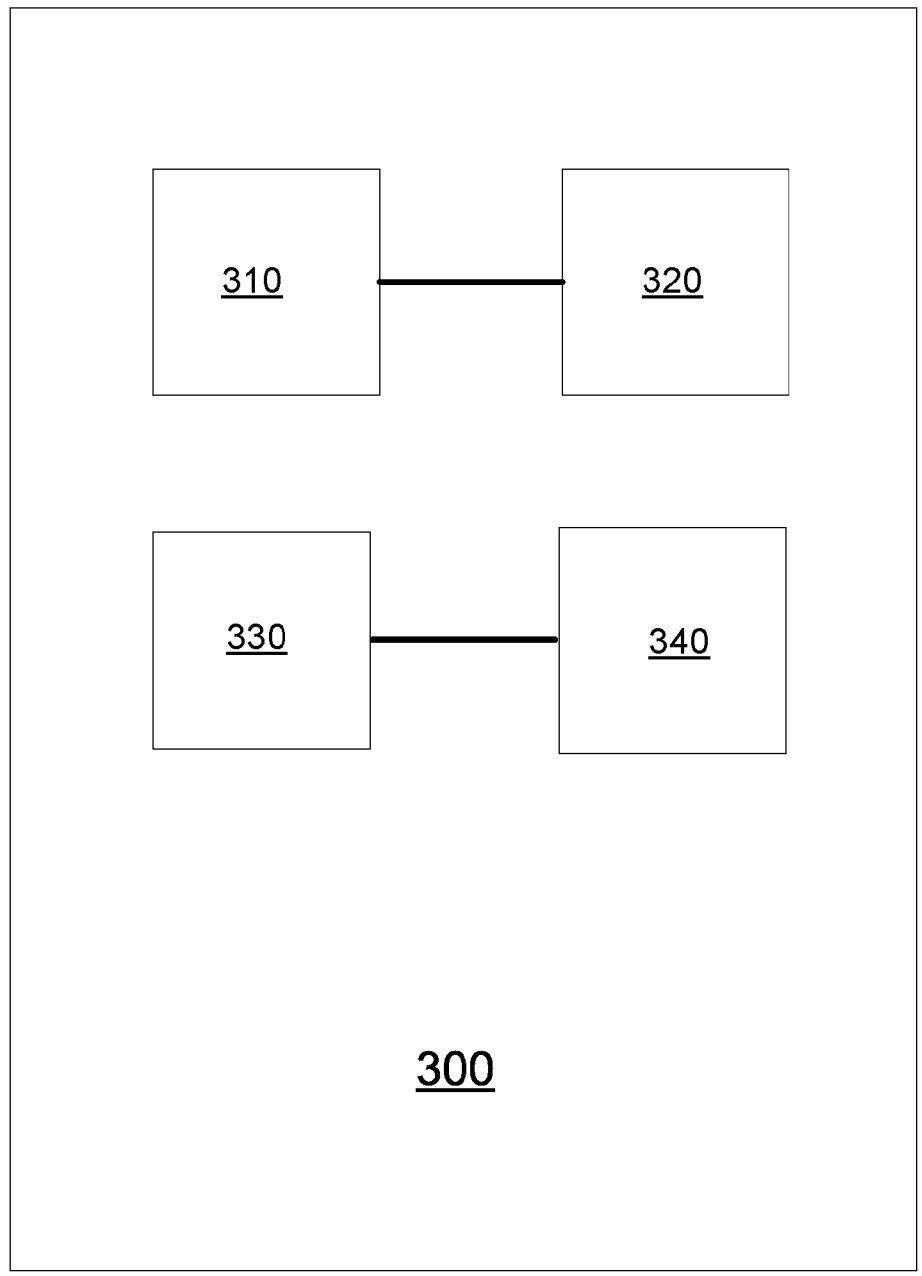
FIG. 3 is a block diagram illustrating a combined vehicle indicator system according to an embodiment.

FIG. 3 illustrates one embodiment of a combined vehicle indicator system 300, which includes a proximity sensor 310 configured to measure a distance of an adjacent vehicle from a base vehicle, and a proximity indicator 320 on a base vehicle that is displayed towards an adjacent vehicle. An intensity of the proximity indicator 320 is inversely proportional to a distance of the adjacent vehicle from the base vehicle. The combined vehicle indicator system 300 can also include a steering column sensor 330 configured to measure a degree of turning of a steering wheel of the base vehicle, and a steering wheel turning indicator 340 on the base vehicle displayed towards the adjacent vehicle. The combined vehicle indicator system 300 also includes circuitry configured to receive an input signal from the proximity sensor 310 and the steering column sensor 330, and circuitry configured to provide an output signal to the proximity indicator 320 and the steering wheel turning indicator 340, respectively.

Figure 4:
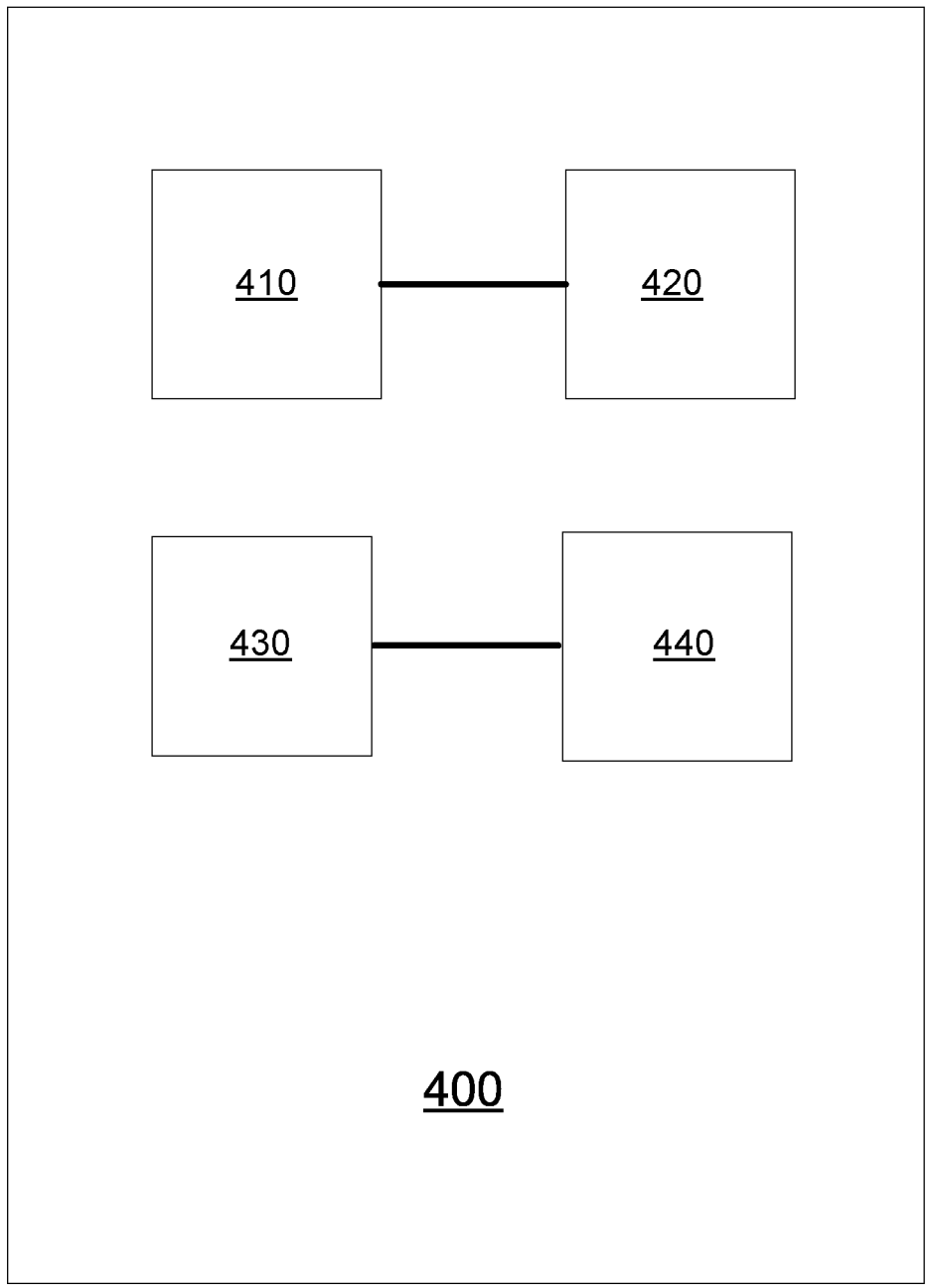
FIG. 4 is a block diagram illustrating a combined vehicle indicator system according to an embodiment.

FIG. 4 illustrates one embodiment of a combined vehicle indicator system 400, which includes a proximity sensor 410 configured to measure a distance of an adjacent vehicle from a base vehicle, and a proximity indicator 420 on the base vehicle that is displayed towards the adjacent vehicle. An intensity of the proximity indicator 420 is inversely proportional to a distance of the adjacent vehicle from the base vehicle. The combined vehicle indicator system 400 can also include a braking sensor 430 configured to measure an intensity of an applied braking force of a base vehicle, and a braking indicator 440 on the base vehicle displayed towards an adjacent vehicle. An intensity of the braking indicator 440 is proportional to the applied braking force of the base vehicle. The combined vehicle indicator system 400 also includes circuitry configured to receive an input signal from the proximity sensor 410 and the braking sensor 430, and circuitry configured to provide an output signal to the proximity indicator 420 and the braking indicator 440, respectively.

Figure 5:
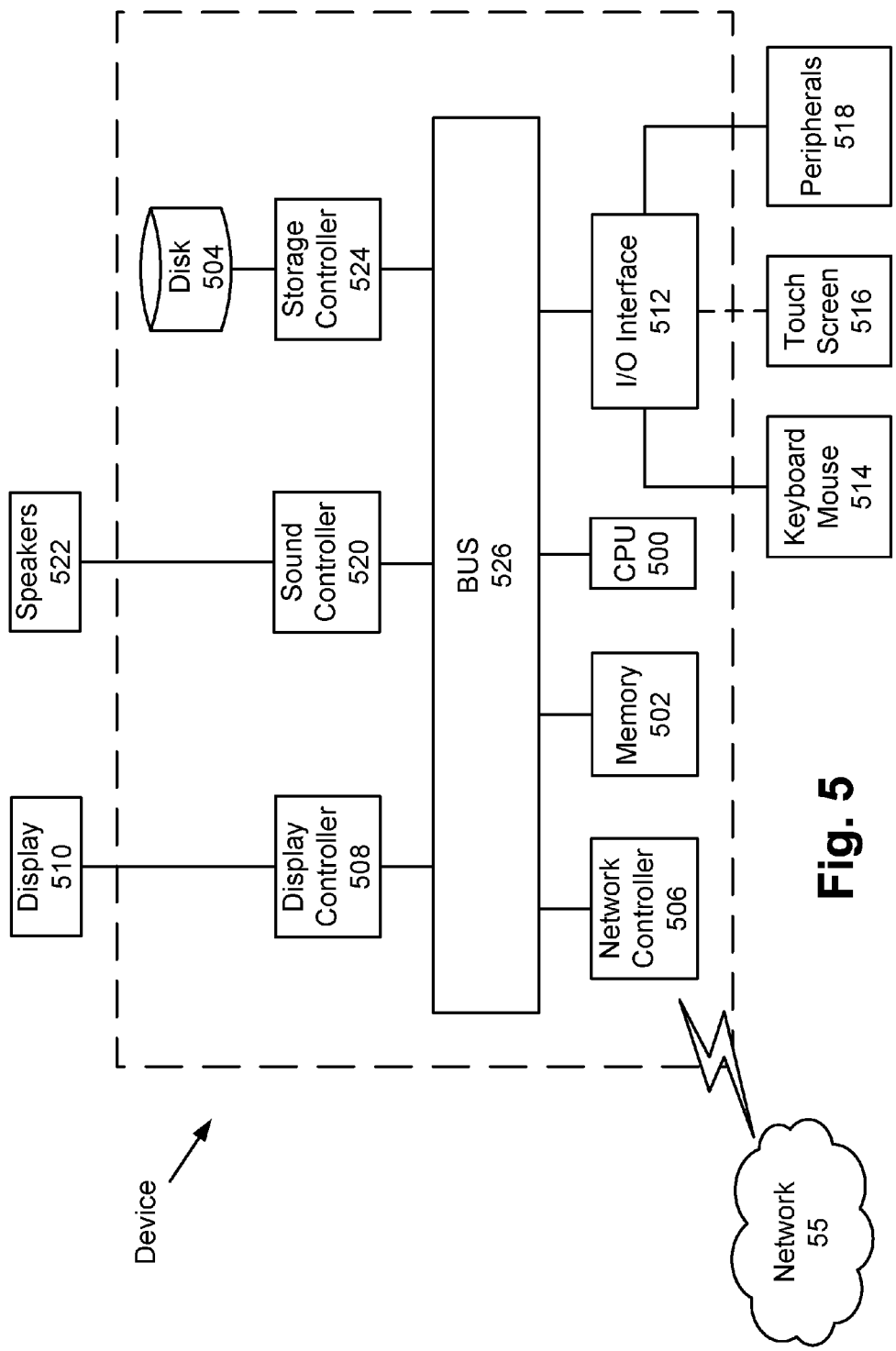
FIG. 5 is a block diagram illustrating a computing system according to an embodiment.

FIG. 5 is a hardware description of a computing system, including processors, servers, and databases used in conjunction with associated circuitry for embodiments described herein and which receives inputs from the various sensors described herein. This circuitry represents hardware and software components whereby the "configured by circuitry" and/or "configured to" elements noted above are programmed. This programming in hardware and software components includes algorithmic instructions to carry out the various functions and acts noted and described above. In FIG. 5, the computing system includes a CPU 500 which performs the processes described above. The process data and instructions may be stored in memory 502. These processes and instructions may also be stored on a storage medium disk 504 such as a hard disk drive (HDD) or portable storage medium or may be stored remotely. Further, the claimed embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing system communicates.

Further, the claimed embodiments may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The computing system in FIG. 5 also includes a network controller 506, such as an Intel Ethernet PRO network interface card from Intel Corporation of America, for interfacing with network 55. As can be appreciated, the network 55 can be a public network, such as the Internet, or a private network such as an LAN or WAN network, or any combination thereof and can also include PSTN or ISDN sub-networks. The network 55 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing system further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface 512 also connects to a variety of peripherals 518 including printers and scanners, such as an OfficeJet or DeskJet from Hewlett Packard.

A sound controller 520 is also provided in the computing system, such as Sound Blaster X-Fi Titanium from Creative, to interface with speakers/microphone 222 thereby providing sounds and/or music.

The general purpose storage controller 524 connects the storage medium disk 504 with communication bus 526, which may be an ISA, EISA, VESA, PCI, or similar, for interconnecting all of the components of the computing system. A description of the general features and functionality of the display 510, keyboard and/or mouse 514, as well as the display controller 508, storage controller 524, network controller 506, sound controller 520, and general purpose I/O interface 512 is omitted herein for brevity as these features are known. In addition, not all features described above need be present in one or more systems described herein.

Figure 6:
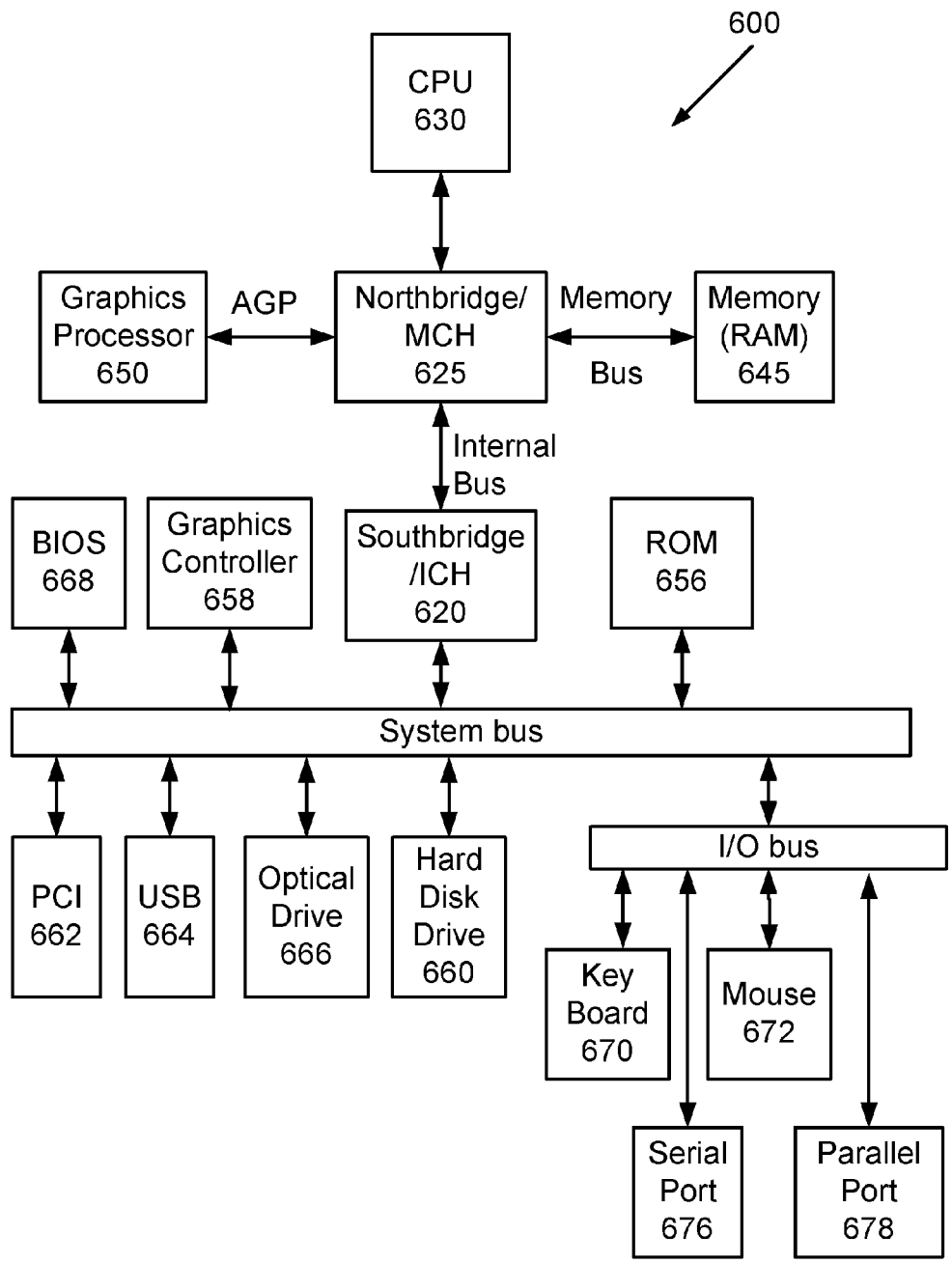
FIG. 6 is a block diagram illustrating a data processing system according to an embodiment.

FIG. 6 shows a schematic diagram of a data processing system, according to certain embodiments for performing sensory and indicator functions as described above. The data processing system is an example of a system chip set in which code or instructions implementing the processes of the illustrative embodiments can be located.

In FIG. 6, data processing system 600 employs an application architecture including a north bridge and memory controller application (NB/MCH) 625 and a south bridge and input/output (I/O) controller application (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU 630 can contain one or more processors and even can be implemented using one or more heterogeneous processor systems.

Figure 7:
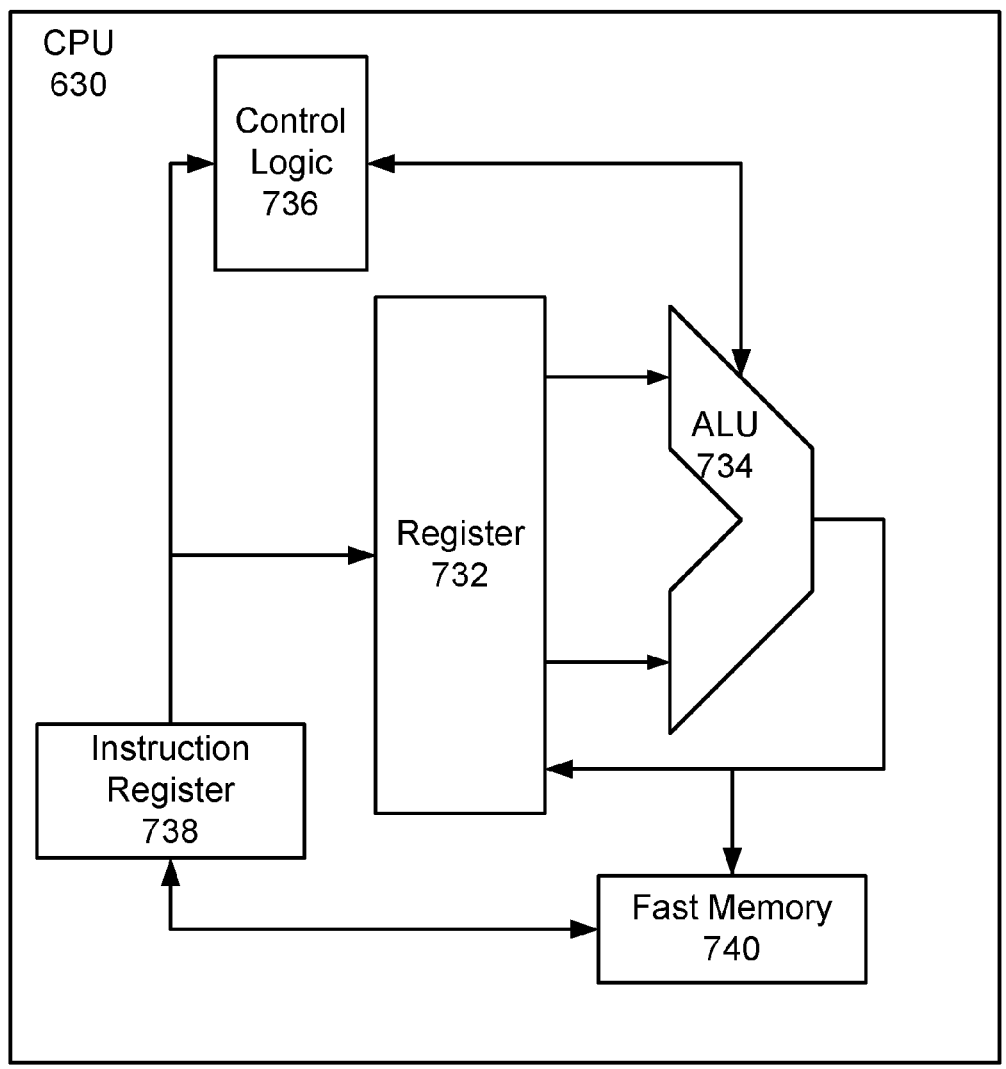
FIG. 7 is a block diagram illustrating a CPU according to an embodiment.

For example, FIG. 7 shows one implementation of CPU 630. In one implementation, an instruction register 738 retrieves instructions from a fast memory 740. At least part of these instructions are fetched from an instruction register 738 by a control logic 736 and interpreted according to the instruction set architecture of the CPU 630. Part of the instructions can also be directed to a register 732. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 734 that loads values from the register 732 and performs logical and mathematical operations on the loaded values according to the instructions. The results from these operations can be fed back into the register 732 and/or stored in a fast memory 740. According to certain implementations, the instruction set architecture of the CPU 630 can use a reduced instruction set architecture (RISC), a complex instruction set computer (CISC), a vector processor architecture, or a very large instruction word (VLIW) architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 6, the data processing system 600 can include the SB/ICH 620 being coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 620 through a PCI bus 662.

The PCI devices can include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein can also be executed by various distributed components of a system. For example, one or more processors can execute these system functions, wherein the processors are distributed across multiple components communicating in a network. The distributed components can include one or more client and server machines, which can share processing, such as a cloud computing system, in addition to various human interface and communication devices (e.g., display monitors, smart phones, tablets, personal digital assistants (PDAs)). The network can be a private network, such as a LAN or WAN, or can be a public network, such as the Internet. Input to the system can be received via direct user input and received remotely either in real-time or as a batch process. Additionally, some implementations can be performed on modules or hardware not identical to those described. Accordingly, other implementations are within the scope that can be claimed.

The functions and features described herein may also be executed by various distributed components of a system, such as a distributed performance of the processing functions using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

Advantages of embodiments described herein provide an increase in traffic safety in many different areas. Various visual and audio indicators can be given to adjacent vehicles for a change in braking, turning, and proximity of a base vehicle. The sensor and indicator systems can also work in conjunction with automatic systems of the base vehicle, such as automatic braking and velocity adjustments to the base vehicle.

The foregoing discussion discloses and describes merely exemplary embodiments. As will be understood by those skilled in the art, the described embodiments may be embodied in other specific forms without departing from the spirit or essential characteristics thereof. Accordingly, the disclosure is intended to be illustrative, but not limiting of the scope of the claims. The disclosure, including any readily discernible variants of the teachings herein, defines in part, the scope of the foregoing claim terminology such that no inventive subject matter is dedicated to the public.

The invention claimed is:

1. A vehicle indicator system, comprising:
a proximity sensor provided on a base vehicle to measure a distance of an adjacent vehicle from the base vehicle;
a braking sensor provided on the base vehicle to measure an applied braking force;
a first indicator provided on the base vehicle at a first position to emit first indicator signal displayed towards the adjacent vehicle, which indicator signal can be ascertained by an operator of the adjacent vehicle, wherein an intensity of the indicator signal is inversely proportional to a distance of the adjacent vehicle from the base vehicle;
a second indicator provided on the base vehicle at a second position to emit a second indicator signal displayed towards the adjacent vehicle, which indicator signal can be ascertained by an operator of the adjacent vehicle, wherein the indicator includes a plurality of lights configured to be illuminated by the indicator signal, and wherein an amount of lights illuminated is proportional to the applied braking pressure; and
circuitry provided at the base vehicle and configured to receive an input signal from the proximity sensor and the braking sensor to provide an output signal to the first and second indicator for generating the first and second indicator signals.

2. The vehicle indicator system of claim 1, wherein the indicator includes at least one of a) one or more lights, b) an audio indicator, or c) a displayed message.

3. The vehicle indicator system of claim 2, wherein an increase of the intensity of the second indicator lights includes increasing a brightness of the one or more lights and increasing a flashing rate of the one or more lights.

4. The vehicle indicator system of claim 2, wherein the audio indicator includes a horn or sound alarm.

5. The vehicle indicator system of claim 4, wherein the horn or sound alarm includes circuitry configured to be programmed from a selection of different audio sources and different musical riffs.

6. The vehicle indicator system of claim 2, wherein an increased intensity of the displayed message includes one or more of a) an increased font size, b) an increased rate of flashing, or c) multiple messages with a similar theme.

7. The vehicle indicator system of claim 1, wherein the proximity sensor includes one of an ultrasonic sensor or a real time location system sensor.

8. The vehicle indicator system of claim 7, wherein the ultrasonic sensor is configured to output a sound pulse from the base vehicle and receive a reflected echo from the adjacent vehicle to calculate the distance from the base vehicle to the adjacent vehicle.

9. The vehicle indicator system of claim 7, wherein the real time location system sensor includes one or more readers of the base vehicle to locate and read a signal from a tag or node of the adjacent vehicle.

10. The vehicle indicator system of claim 1, wherein the plurality of lights includes at least five lights and an order of illumination of the lights is outwards inwards based on the applied braking pressure.

11. The vehicle indicator system of claim 10, wherein the circuitry compares braking sensor values and proximity sensor values to respective threshold values when generating the first and second indicator signals, the respective threshold values being determined based on a relative distance between the base vehicle and the adjacent vehicle.

12. A vehicle indicator system, comprising:
a braking sensor provided on a base vehicle to measure an intensity of an applied braking force of the base vehicle;
a braking indicator provided on the base vehicle at a first position to emit a braking indicator signal displayed towards an adjacent vehicle, which braking indicator signal can be ascertained by an operator of the adjacent vehicle, wherein an intensity of the braking indicator signal is proportional to the applied braking force of the base vehicle, wherein the braking indicator includes a plurality of lights configured to be illuminated by the braking indicator signal, and wherein an amount of lights illuminated is proportional to the applied braking pressure;
a steering column sensor provided on the base vehicle to measure a degree of turning of a steering wheel of the base vehicle;
a steering wheel turning indicator provided on the base vehicle at a second position to emit a steering wheel turning indicator signal displayed towards the adjacent vehicle, which steering wheel turning indicator signal can be ascertained by the operator of the adjacent vehicle, wherein an intensity of the steering wheel turning indicator signal is proportional to the degree of the turning of the steering wheel of the base vehicle; and
circuitry provided at the base vehicle and configured to receive an input signal from the braking sensor and the steering column sensor, and circuitry provided at the base vehicle and configured to provide an output signal to the braking indicator and the steering wheel turning indicator, respectively for generating the associated braking indicator signal and steering wheel turning indicator signal.

13. The vehicle indicator system of claim 12, wherein the plurality of lights include a series of left and right arrows that illuminate upon turning the steering wheel counter-clockwise and clockwise, respectively.

14. The vehicle indicator system of claim 13, wherein an increased number of left and right arrows illuminate in direct proportion to an increase in turning of the steering wheel in the counter-clockwise and clockwise directions, respectively.

15. The vehicle indicator system of claim 13, wherein the steering wheel turning indicator includes a plurality of leftward-pointing arrows on a left mirror of the base vehicle and a plurality of rightward-pointing arrows on a right mirror of the base vehicle.

16. The vehicle indicator system of claim 13, wherein the steering wheel turning indicator includes a plurality of leftward-pointing arrows on a left rear side of the base vehicle and a plurality of rightward-pointing arrows on a right rear side of the base vehicle.

17. The vehicle indicator system of claim 13, wherein the braking sensor is adjacent to a brake pedal of the base vehicle, and the braking sensor outputs a signal to the braking indicator in direct proportion to an amount of braking force applied to the brake pedal.

18. The vehicle indicator system of claim 12, wherein the steering wheel turning indicator includes a plurality of lights and an amount of lights illuminated proportional to the degree of the turning of the steering wheel of the base vehicle.

19. The vehicle indicator system of claim 18, wherein the plurality of lights of the steering wheel turning indicator flash at a rate proportional to the degree of turning of the steering wheel of the base vehicle.

20. A vehicle indicator system, comprising:
a proximity sensor provided on a base vehicle to measure a distance of an adjacent vehicle from the base vehicle;
a braking sensor provided on the base vehicle to measure an intensity of an applied braking force of the base vehicle;
a proximity indicator provided on the base vehicle at a first position to emit a proximity indicator signal displayed towards the adjacent vehicle, which proximity indicator signal can be ascertained by an operator of the adjacent vehicle, wherein an intensity of the proximity indicator signal is inversely proportional to a distance of the adjacent vehicle from the base vehicle;
a braking indicator provided on the base vehicle at a third position to emit a braking indicator signal displayed towards the adjacent vehicle, which braking indicator signal can be ascertained by the operator of the adjacent vehicle, wherein an intensity of the braking indicator signal is proportional to the applied braking force of the base vehicle, wherein the braking indicator includes a plurality of lights configured to be illuminated by the braking indicator signal, and wherein an amount of lights illuminated is proportional to the applied braking pressure;
a steering column sensor provided on the base vehicle to measure a degree of turning of a steering wheel of the base vehicle;
a steering wheel turning indicator provided on the base vehicle at a second position to emit a steering wheel turning indicator signal displayed towards the adjacent vehicle, which steering wheel turning indicator signal can be ascertained by the operator of the adjacent vehicle, wherein an intensity of the steering wheel turning indicator signal is proportional to the degree of the turning of the steering wheel of the base vehicle;
circuitry provided at the base vehicle and configured to receive an input signal from the proximity sensor and the steering column sensor, and circuitry provided at the base vehicle and configured to provide an output signal to the proximity indicator and the steering wheel turning indicator, respectively for generating the associated proximity indicator signal and steering wheel turning indicator signal; and
circuitry provided at the base vehicle and configured to receive an input signal from the braking sensor and to provide an output signal to the braking indicator for generating the braking indicator signal.

* * * * *